J. Hoover,
Fly Trap,
N° 84,825.   Patented Dec. 8, 1868
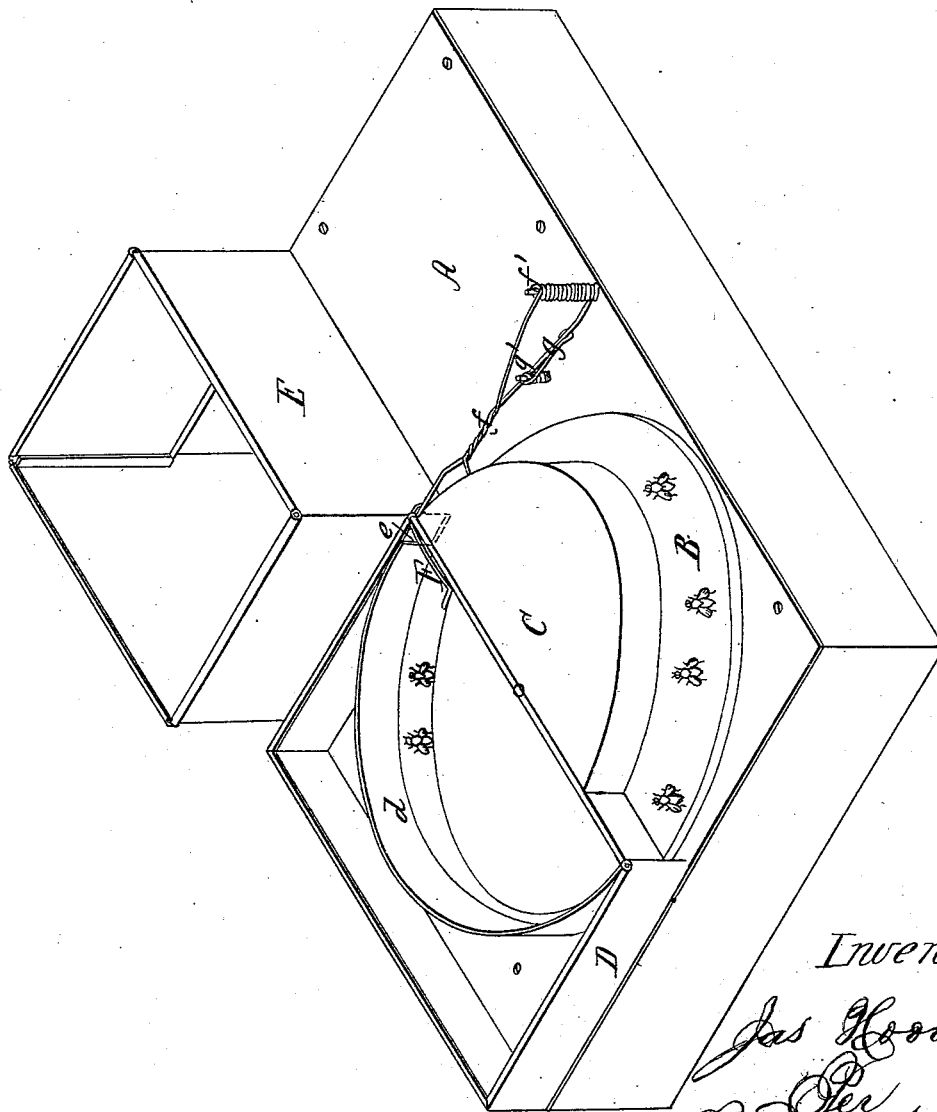
Witnesses;
John A. Ellis
J. D. White
Inventor;
Jas Hoover
Per
L. H. Alexander
Atty

JAMES HOOVER, OF GRATIS, OHIO.

Letters Patent No. 84,825, dated December 8, 1868.

IMPROVED FLY-TRAP.

The Schedule referred to in these Letters Patent and making part of the same.

*To all whom it may concern:*

Be it known that I, JAMES HOOVER, of Gratis, in the county of Preble, and State of Ohio, have invented certain new and useful Improvements in Fly-Traps; and I do hereby declare that the following is a full, clear, and exact description thereof, reference being had to the accompanying drawings, and to the letters of reference marked thereon, which form a part of this specification, and in which—

Figure 1 represents a perspective view of my fly-trap.

The nature of my invention consists in providing a platform or block with a revolving circular plate or disk, upon which is constructed or formed an elevation or shoulder, made S-shape, and furnished on about half its surface with a covering or casing, in combination with a spring-trap door fitting over an opening in a reservoir, into which the flies are precipitated by said door, after having been caught or secured on that part of the revolving disk beneath the casing.

To enable others to make and employ my invention, I will now describe its construction and operation.

In the accompanying drawings,

A represents a platform or casing, upon which is pivoted a revolving plate or disk, B, constructed, on its upper side, with an elevation or shoulder, C, made S-shape, so as to present a surface on both of its sides for the flies to alight on the plate or disk, which is supplied with bait or any suitable substance for attracting the flies, and having its ends projecting out alternately flush with the circumference of the disk B, so as to prevent the flies, after having been enclosed under the covering D and flange d, from escaping.

D is a covering or casing, enclosing about one-half the surface of disk B, and provided, on its inner side, with the semicircular flange or partition d.

F is a trap-door, which is bent, at its outer end, right-angular with its main portion, so as to allow it to fit into the reduced ends of elevation, C, on disk B, and also to precipitate the flies brought in contact with it by the revolving of disk B into the opening, e, of reservoir E.

This door is supplied, at its outer end, with a spring bar, f, secured, at its outer end, in coils on a vertical bar or shaft, f', for hinging it.

g is a wire bar or rod fastened at one end to the spring-bar f, and coiled at its opposite end around a bar, g', and acting as a spring for throwing the trap-door back into its original position after it has scraped the flies into the reservoir E.

The reservoir E may be filled with a solution or water for killing the flies thrown therein by the trap-door.

The revolving disk B can be rotated by any suitable machinery placed inside of the casing A, and applied to a gear-wheel on a shaft secured to the under side of the disk B.

Having thus described my invention,

What I claim as new, and desire to secure by Letters Patent, is—

1. The revolving circular plate or disk B, constructed on its upper side with the S-shaped shoulder or elevation C, arranged and operating substantially as and for the purpose set forth.

2. The employment of the trap-door F, provided with the spring-bar f, attached to bar f' and spring g, secured to bar g', constructed, arranged, and operated substantially as and for the purpose described.

3. Platform or casing A, plate or disk B, elevation or shoulder C, casing or covering D, flange or partition d, trap-door F, spring-bar f, bar f', spring g, bar g', and reservoir E, provided with opening e, all combined, constructed, arranged, and operated substantially as and for the purpose set forth.

In testimony that I claim the foregoing as my own, I affix my signature in presence of two witnesses.

JAMES HOOVER.

Witnesses:
   JOS. SHIVELEY,
   C. H. GRIMES.